Oct. 27, 1970   J. W. JONES, JR., ET AL   3,536,928
COOLING ARRANGEMENT FOR ELECTRIC POWER GENERATING PLANTS
Filed Feb. 9, 1968
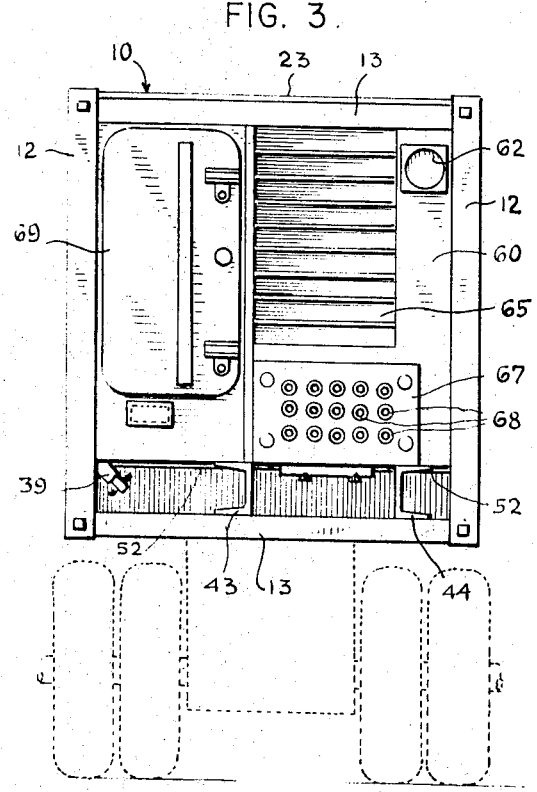
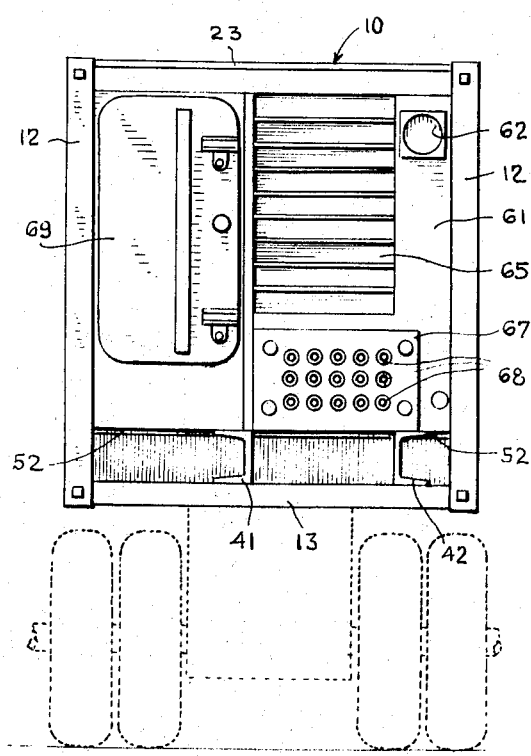
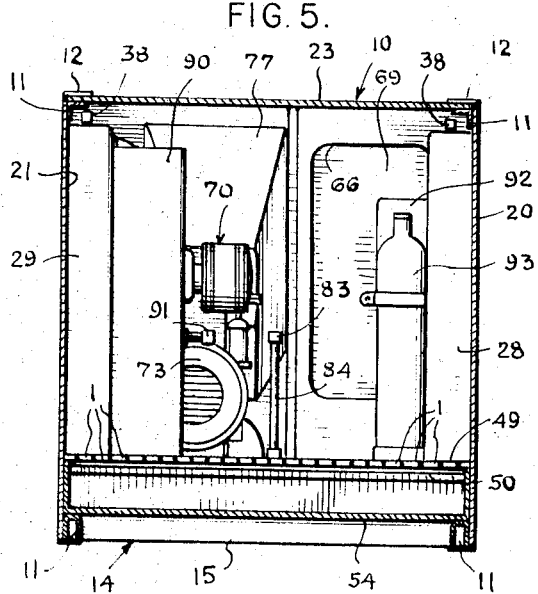
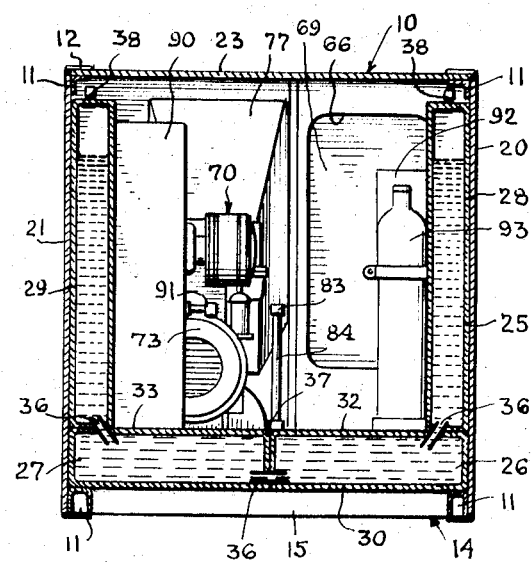
INVENTOR.
JOHN W. JONES, JR.
DAVID TREVORROW

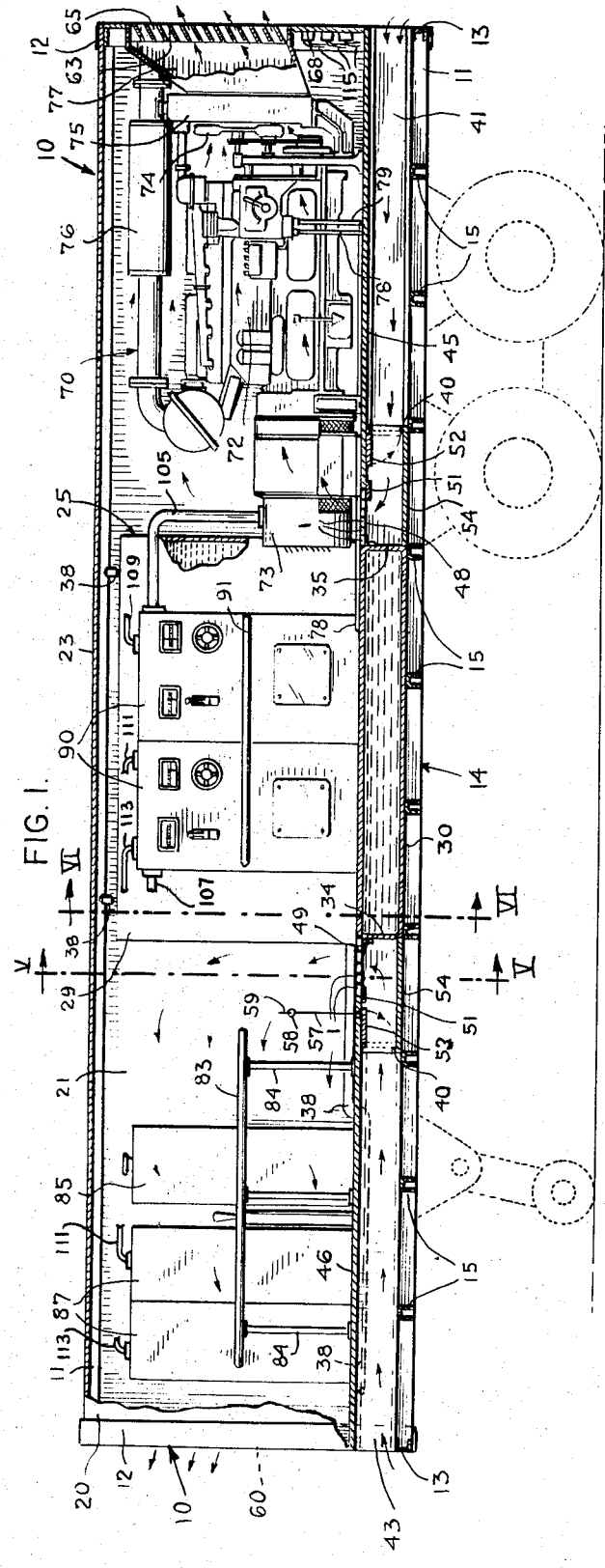
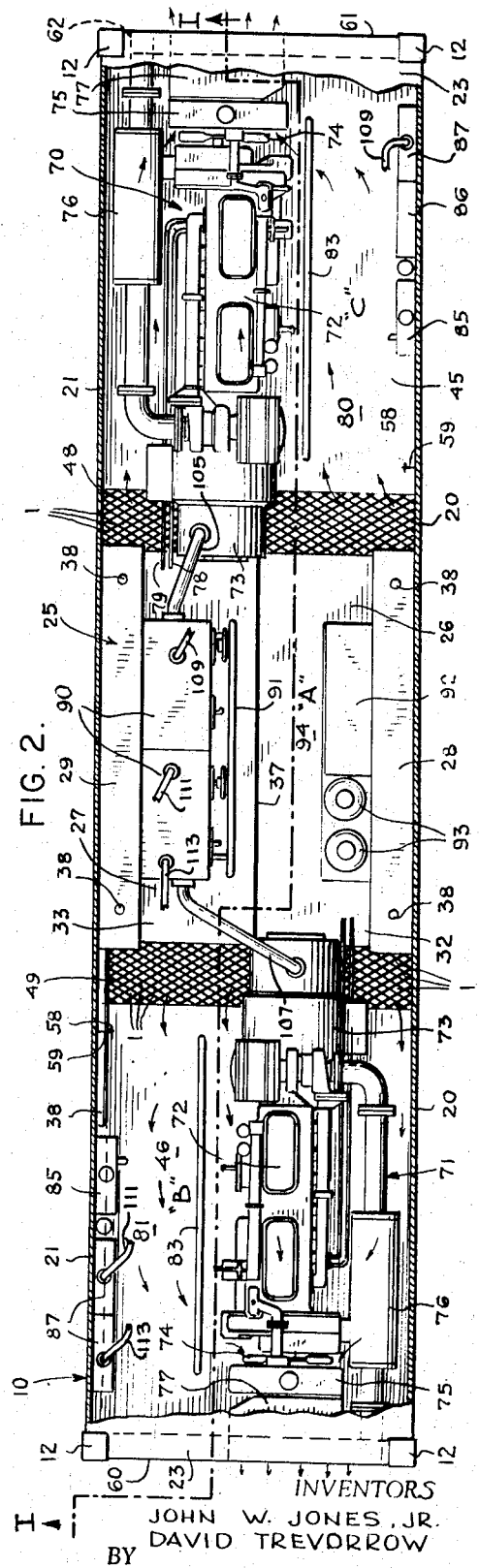

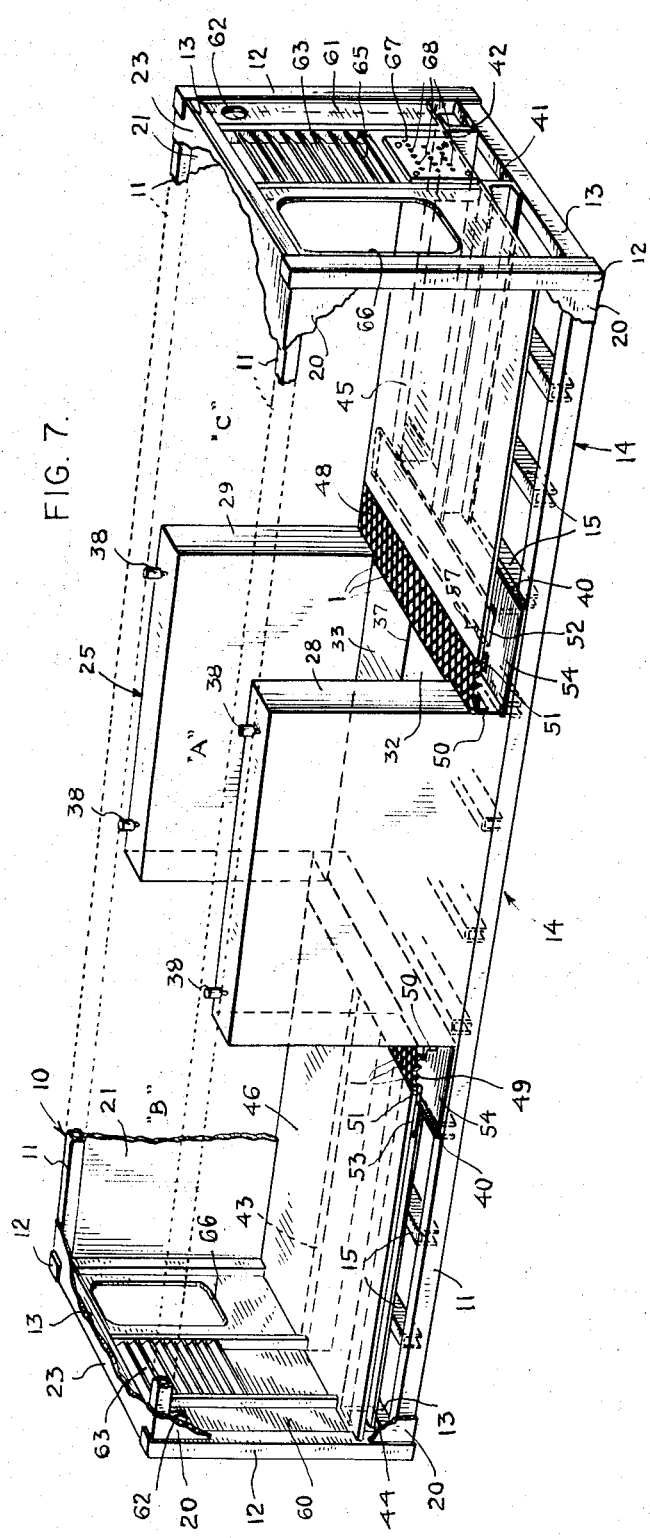

United States Patent Office 3,536,928
Patented Oct. 27, 1970

1

3,536,928
COOLING ARRANGEMENT FOR ELECTRIC POWER GENERATING PLANTS
John W. Jones, Jr., Bernardsville, and David Trevorrow, Chester, N.J., assignors to Foley Machinery Co., Piscataway, N.J., a corporation of New Jersey
Filed Feb. 9, 1968, Ser. No. 704,376
Int. Cl. F01d 15/10
U.S. Cl. 290—1                       10 Claims

ABSTRACT OF THE DISCLOSURE

A trailer-like housing for a portable electric generating plant is disclosed in which two independent fluid fuel engines and two electric generators are enclosed. An air cooling arrangement for the plant equipment includes air intakes and outlets both on the front and rear ends of the housing for intaking air on both the front and rear housing ends, passing it through under the floor conduits to passageways centrally located in the housing and then through respective end zones in which the engines and generators are located for exhaust through both the front and rear ends. Movable gates cooperate with passageways and louvers for the air outlets to control the escape of gases from the engine and generator compartments. Door access is provided at the front and rear ends for personnel to enter the housing onto walkways between the front and rear. A U-shaped fuel tank is located in a zone intermediate the front and rear ends. The housing is equipped with instrument and electrical control and distribution panels.

BACKGROUND OF THE INVENTION

The field of the present invention is electric power generating plants and especially those which are portable and find use on ships and other places where electric power is needed. A type of unit electric power generating plant is disclosed in U.S. patent to H. D. Gumpper, 2,004,405, of June 11, 1935. This patent discloses a housing having an electric power generating unit therein, lacks features which would enable an operator to enter the housing, walk therealong inside of the housing from one end to the other, further lacks the features of a pair of such units, and construction and arrangement of parts so that when the fans are in active service streams of air travel in opposite directions through the end zones of the housing in which the engine generator units are disposed, the end zones being located on either side of a zone in which a fuel tank is located and the air in the last mentioned zone being relatively quiet.

SUMMARY OF THE INVENTION

The invention is electric power generating plants, each comprising a housing including a pair of spaced sides, and a top; a pair of electric power generating units, each unit supported by the housing and spaced above the lower extremities of the sides and including a fluid fuel operated engine and an electric generator driven by the engine; one of the engines is located in an end zone of the housing and the other engine is located in the other end zone of the housing; a fan located in each end zone; means for containing a supply of the fluid fuel and communicating with the engines, said means being supported by the housing and disposed in a zone between said end zones,

2 floor means in the end zones, supported by the housing, spaced above the lower extremities of the sides and extending inwardly from the ends of the housing; passageways for the passage of air therethrough from the space between the floor means and the lower extremities of the sides into the end zones; each fan when in active service, moving atmospheric air through the space between the lower extremities of the sides and the floor means, through the passageways, through the corresponding end zone and then from the housing through a corresponding end thereof.

BRIEF DESCRIPTION OF THE DRAWINGS

FIG. 1 is a cross sectional view on line I—I of FIG. 2 in the direction of the arrows and illustrates a specific embodiment of the invention.

FIG. 2 is a plan view of FIG. 1 with most of the top being removed.

FIGS. 3 and 4 are left and right hand end views respectively of FIG. 1.

FIGS. 5 and 6 are vertical cross sectional views on line V—V and VI—VI respectively of FIG. 1 in the direction of the arrows.

FIG. 7 is a perspective view of the housing in fragmentary form together with certain other parts showing the arrangement thereof with respect to each other and illustrating an intermediate zone in which the fuel tank is located and end zones on either side thereof.

FIG. 8 is a diagrammatic view showing the flow of atmospheric air in the course of being inspirated to and through the air passageways and the flow thereof in opposite directions with respect to each other through the end zones of the housing, disposed at either side of an intermediate zone.

DESCRIPTION OF THE PREFERRED EMBODIMENTS

As shown in the drawings, merely for the purpose of illustrating one of the specific embodiments of the invention, one of the members thereof is a housing 10 which is a modified trailer body or box removably coupled with a plurality of wheels and other elements for transportation from one locale to another. The housing includes a frame which is that of a conventional trailer body design and consists of four relatively long upper and lower horizontal rigid metal rails 11 whose ends are rigidly secured to four parallel vertical rigid metal rails 12 at the ends thereof, and four parallel horizontal cross rigid metal rails 13 are disposed between rails 12 and are rigidly secured thereto. A plurality of other rigid metal cross rails 15 are disposed parallel to each other and to rails 13 and are spaced from each other and extend between the lower rails 11 and are rigidly secured thereto and together with lower rails 11 serve as bottom 14 of the housing. If desired, an imperforate metal panel (not shown) may be disposed on either the upper or lower sides of the cross rails 13 and 15 and secured and sealed thereto to close off all the spaces between those cross rails.

A pair of substantially imperforate rectangular elongated metal sides or panels 20 and 21 are rigidly secured and substantially air-sealed to rails 11 and 12. A rigid rectangular imperforate metal top or roof panel 23 is rigidly secured and substantially air-sealed to the upper side rails 11 and upper cross rails 13. The aforedescribed open ended box may be dimensioned as desired and in this specific illustrative embodiment is approximately 35′ long, 8′ wide and 8½′ high representing the dimensions of one of a conventional trailer body.

A fluid fuel supply tank 25, for containing engine fuel oil or the like, is located in the approximate mid-zone A of the housing 10, is preferably approximately U-shape, and may, as shown consist of a plurality of individual horizontal like tanks 26 and 27 being the web of the U and vertical like tanks 28 and 29 being the legs of the U, all in communication with each other through short conduits 36. All of the individual tanks are made of rigid thick steel plates of about ¼″–½″ thick, which are strong welded together. The tanks 26 and 27 extend alongside each other and the bottom walls thereof rest on a plurality of rails 15 of bottom 14 and extend from side 20 to 21 and the top walls 32 and 33 thereof in like manner are contiguous with each other and also extend across the entire distance between sides 20 and 21. The top walls 32 and 33 are in substantially the same horizontal plane and are welded together along line 37 thereby providing a substantially continuous platform. The end walls 34 and 35 of tanks 26 and 27 are vertically disposed. The vertical tanks 28 and 29 have vents 38 in their tops and are supported by tanks 26 and 27, extend upwardly therefrom and are disposed against the individual sides 20 and 21 respectively to which they are secured. An inlet tube is disposed in said box and in communication with tank 25 and terminates in fitting 39 for refilling tank 25 when required. The individual tanks are so dimensioned as to have a reasonable fuel capacity which in this embodiment is approximately 1500 gallons and also so that the area of the platform formed by walls 32 and 33 between tanks 28 and 29 is adequate for the purposes hereinafter described. In general the width of the platform, that is its dimension measured between the walls of 28 and 29, is at least about 5 feet and the length of the platform, that is its distance measured along the length of the box is at least about 150% of said width and for most purposes is up to about 300% of said width.

A plurality of elongated rigid metal rails 41, 42, 43 and 44 extend lengthwise along the length of the box and are mounted on the cross rails 15 and are rigidly secured thereto and serve as spacers and supports for a rigid flooring, which is in like sections 45 and 46 mounted thereon and secured thereto so that the floor is maintained spaced from the bottom 14 of the box and preferably in such horizontal position that the upper surface of sections 45 and 46 and the upper surface of the platform formed by walls 32 and 33 are in approximately the same plane. Each floor section 45 and 46 is of thick steel plate, about ¼″–¾″ thick and extends across the entire width of the box and from one end of the box to the tank 25. Sections 45 and 46 are substantially imperforate throughout substantially the entire areas thereof, except for portions or bands 48 and 49 thereof adjacent tank 25 which have perforations therethrough thereby providing passageways therein for the passage of air therethrough. The parts 48 and 49 of sections 45 and 46 are preferably separate grates as shown, which are supported at one end by angle irons 50 welded to the walls 34 and 35 and at their other ends by a narrow rigid metal strip 51 welded to the bottom of the substantially imperforate parts of those sections and extending along the widths thereof. While the passageways 1 are shown close to the tank as a preferential location therof, they may be located at other locations and generally may be spaced a considerable distance from the tank but preferably in that part thereof no greater than about half way from the tank to the end of the corresponding floor section. Pivotally secured to and depending from the sections 45 and 46 are a pair of dampers or gates 52 and 53 which in one position prevent the passage of gases from the space between top 23 and the flooring and tank to the outer atmosphere and when in another position permits the passage of atmospheric air into said space.

Closure cover plates 54 extend across the lower elongated rails 11 and from the tank 25 towards the ends of the box and up to the lower extremities of the gates which make a tight slide fit therewith against stops 40 for said shut off purpose.

One set of rails 41 and 42 are parallel to each other, are spaced from each other and sides 20 and 21, and extend from one end of the box towards tank 25 and terminate at about the gate 52 when it is in "closed" or vertical position, and the other set of rails 43 and 44 are also parallel to each other and spaced from each other and sides 20 and 21, extend from the other end of the box towards tank 25 and terminate at about gate 53 when it is in "closed" or vertical position. Thin draw wires 57 are connected to the lower ends of gates 52 and 53, extend through small openings in the floor sections and terminate in rings 58 adapted to be engaged with and disengaged from hooks 59 secured to the sides 20 and 21. When disengaged from the hooks the gates are in their closed positions. By pulling the wires the gates are swung upwardly about their pivots to their open positions and are so maintained by inserting the hooks in the rings; and, the gates will automatically swing downwardly to closed position by disengaging the rings from the hooks.

The housing 10 also includes a pair of rigid metal substantially imperforate end panels or closures 60 and 61 secured to the frame at the ends of the sides and being substantially air-sealed therewith. Each end closure has an engine-exhaust discharge opening 62 in an upper corner thereof, a vertical elongated opening 63 in a vertical half section thereof in which are a plurality of manually openable and closeable louvers or shutters 65 which may be manually opened or closed for permitting and preventing the passage of gases therethrough, and a vertical elongated opening 66 in the other vertical half section thereof of sufficient width and height to permit the passage of an adult operator therethrough. Each of said closures also includes a receptacle plate 67 below the shutters and which carries a plurality of electric output receptacles 68. Each closure also includes a swingable door 69 adapted to be swung to open and shut positions and a latch for maintaining said door in closed position when so desired. As shown, the lower extremities of panels 60 and 61 are adjacent floor sections 45 and 46 and do not extend therebelow so that the space between the floor sections and the bottom 14 is unobstructed thereby. Located in the end zones B and C of said housing are a pair of electric power generator units 70 and 71 mounted on the bottom 14 by being secured to the floor sections 45 and 46 or directly to the upper parts of the rails 41–44 secured to said bottom 14 whereby they are maintained in fixed position and spaced from the bottom 14. Each of said units includes a fluid fuel operated engine, such as gasoline, Diesel or like engine coupled with an electric generator driven thereby. In this particular embodiment, each unit includes a six cylinder "Caterpillar" Model D–342T Diesel engine 72, (229 BHP continuous at 1200 r.p.m.), operatively coupled at one end thereof with and for driving an electric generator 73 (150 kw. continuous at 1200 r.p.m., 3 phase, 60 cycle, 440 volts, power factor, lagging 0.8). Each unit also includes a fan 74. However, the fan may be separate from the unit and may be electrically driven if so desired. Each engine 72 is in communication with tank 25 through conduit 78 extending into tank 25 and connected to the fuel pump of the engine to supply fuel to the engine. A conventional fuel return line 79 extends from pump back to tank 25.

As shown, the fan is operatively coupled with the engine at the other end thereof and driven thereby. A cooling radiator 75 is operatively connected to the engine at said other end and beyond fan 74, with the fan and radiator being disposed in the air discharge region of the end zone in which they are located. Each unit also includes a muffler 76 operatively connected to the engine 72 and disposed to one side and above said engine. Said units are so disposed and extend horizontally lengthwise preferably as shown in opposite directions along the length of the housing so that the fan and radiator of one unit are disposed in the air discharge region of housing 10 and the fan and radiator of the other unit are disposed at the other air discharge region of housing 10, and the generators 73 of the respective units are spaced horizontally from each other and are disposed between the engines of said units. In addition, unit 70 is located adjacent to side 21 and is spaced a substantial distance from side 20 and unit 71 is adjacent to side 20 and is spaced a substantial distance from side 21 whereby walkways 80 and 81 of at least and as shown of more than adequate width (at least about 1½ feet) remain so that an operator may walk therealong with safety.

A sheet metal duct 77 is secured to each of said panels 60 and 61 around the air-discharge openings therein and extends towards and terminates close to the radiator nearer the panel to which it is secured. And, like the corresponding units, these ducts also are disposed close to one side and spaced a considerable distance from the other side of the housing for the purpose hereinbefore described. The ducts 77 serve to confine in predetermined confined paths the passage of air from the fans and radiators in the course of the passage of air in the course of its travel to the air discharge openings.

A protecting hand rail 83 is spaced from, extends lengthwise along the length of each of said units and is supported by standards 84 secured to the floor sections and due to the available space, a plurality of vertically extending elongated relatively "thin" tanks 85, and 86 for containing make up water and lubricating oil respectively are secured to side 20 as is a vertically extending "thin" conventional distribution panel board 87 without reducing intolerably the distance therebetween and the cross bars. A pair of similar panel boards 87 and lube tank 85 are similarly disposed adjacent to side 21.

Located in the mid-zone A are plurality of switch gear panels 90 which are essentially NEMA standard or conventional equipment racks containing generator circuit breakers, feeder circuit breakers, auxiliary power circuit breakers, synchronizing equipment, ground detection ammeter, indicating lights and output metering for each Diesel-generator unit, etc. The switch gear panels are arranged side by side and are supported by the web of the U-tank 25 and extend vertically upwardly therefrom, with their backs being adjacent leg 29 of the tank and anchored thereto, and with the front of said panels containing the instruments, such as the voltmeter, frequency meter, ammeter, generator run lamp, etc., and the actuable control elements. A grab rail 91 is secured to the front of panels 90. A pair of fire extinguisher cylinders 93 of the carbon dioxide type are supported by the web of tank 25 and extend upwardly therefrom and closely adjacent leg 28 and are maintained in position by straps. Disposed alongside of tanks 93 is a conventional hydraulic starting cabinet for the engines. This may be eliminated and each engine may include a starter as part thereof and of the individual units 70 and 71. In this arrangement as shown and described, between the panels 90 or guard rail 91 and tanks 93 or starter cabinet 92, there is a walkway 94 of adequate and sufficient width that an operator may walk thereon along the mid-zone of the housing and also may stand thereon to reach the instruments and manipulate the controls of panels 90. In this embodiment, that width is preferably at least as great as the width of the walkways 80 and 81 so that there is a path of adequate width from about one end of the housing to about the other end over which the operator may walk with safety thereby enabling him to enter the housing through one of openings 66 walk along the walkway 80 then along the walkway 94 whose ends are enlarged and then along walkway 81 and outer of the other opening 66.

Generator 73 of unit 70 is electrically connected to a panel 90 by suitable armored conductors 105 extending upwardly from generator 73 and then over to panel 90. Suitable armored conductors 107 electrically connect generator 73 of unit 71 to the other panel 90, and extends upwardly from generator 73 towards the top panel of the housing and as close thereto as possible then slightly downwardly to the panel 90 so that there is ample space therebelow permitting the passage of the operator in upright position therebelow in the course of his travel through the housing. A panel 90 which is an instrument and main control panel, is electrically connected to the distribution control panel 87 in zone C by suitable armored conductors 109; and the other like panel 90 is electrically connected to the two distribution control panels 87 in zone B by suitable armored conductors 111 and 113. These conductors 109, 111 and 113 also extend upwardly from the panels and extend along and close to the top 23 so as not to be obstructions in the space through which the operator travels. The receptacles 68 carried by panel 60 are electrically connected to the panel 87 by conductors 115 which extend downwardly from the receptacles and along panel below access opening therein and along the side to which the panel in zone C is secured. The receptacles 68 carried by panel 61 are in like manner electrically connected to the panels 87 in zone B. A cover (not shown) is provided for said conductors and over which the operator steps over in entering the housing through the access openings. The panel 87 in zone C and panels 87 in zone B are as shown preferably located near the discharge ends of said zones so that they are readily available to the operator upon first entering the access openings so that he may electrically disconnect the receptacles which are individually connected to respective breakers therefor carried by said distribution panels.

In the embodiments described, the operator can walk in upright position safely from and through one end of the box to and through the other.

The aforedescribed electrical power generating plants are portable and are readily movable from place to place. One of the illustrative uses of these plants is on ships for supplying electrical power. When so employed one of them, for example, is supported on a deck of the ship with the bottom thereof being contiguous with the deck surface. The louvers and gates are in open condition as shown in FIG. 1. The operator opens the louvers, unlatches and opens one of the doors and steps through an opening 66 onto one of the walkways, closes the door and walks along the path in the housing, opens the gates and starts the engines, and walks onto the platform where he is in a position to observe the readings on the instruments of panels 90 and manipulate the controls if required. The fully operating units are so maintained due to the fuel being supplied to the internal combustion engines from tank 25, and supply electrical power from the generators to the receptacles 68 through the electrically interconnected panels 90 and 87. The operating engines drive the fans which cause the inspiration of atmospheric air into each end of the housing and into the space between the flooring and the lower extremity of the housing and along said space. As shown, ths space in each of the end zones of the housing consists of three separate elongated spaces or air-ways between the sides 20 and 21 and the elongated rails. The air is inspired in opposite directions from the outer atmosphere and in substantially two separate paths and is discharged out of housing 10. The fan in end zone A moves atmospheric air into one end of the housing and along the rails 41 and 42 and in a direction from that end towards the tank 25, then through the passageways in grate 48 up into the zone C and then in the opposite direction through the zone C to cool unit 70 and supply air therefor, then through the corresponding radiator, then through the corresponding duct 77 and finally through the open louvers in panel 61 and simultaneously the fan in end zone B moves atmospheric air into the other end of the housing along rails 43 and 44 in a direction opposite to said first mentioned direction and towards the tank 25, then through the passageways in grate 49 up into the zone B and then in a direction opposite to the second mentioned direction through zone B to cool unit 71 and supply air therefor, then through the corresponding radiator and duct and finally through the open louver in panel 60. These two substantially separate streams of air, whose downstream ends are spaced from each other, sweep or travel in opposite directions through the respective end zones B, C, while the air in the zone A is relatively quiet. This condition in the housing permits the operator to be away from the fast moving air streams through zones B and C when he is standing on the platform in zone A when he is observing the instrument readings and manipulating elements of the switch gear panels.

Should fire occur in the housing, the operator stops the engines, the louvers in each of the panels are closed the gates are swung to the closed positions and the fire extinguishers are turned on, the operator leaves the housing through one of the doors and recloses same. The housing which is now substantially sealed from the outer atmosphere is flooded with carbon dioxide gas thereby causing extinguishment of the fire. This condition may be maintained until all of the carbon dioxide has been discharged from the extinguishers. Then the louvers and doors are opened whereby the carbon dioxide gas passes therethrough and air enters the housing. The operator now enters the housing and walks from one end to the other along the continuous path provided walkways 80 and 81 and the platform, and inspects the elements therein and makes the necessary repairs and/or adjustments. The spent extinguishers are replaced and the gates are moved to open position and the plant is now again ready for operation after opening also louver 65.

Instead of manually stopping the engines, closing the louvers, moving the gates to closed position and/or turning on the fire extinguishers, the foregoing may be individually or jointly effected by associating one or more appropriate heat-sensing actuating devices or systems (not shown) therewith. Preferentially, a system (not shown) including one or more of said devices is associated with the engines, louvers, gates and fire extinguishers, so that when a fire occurs in the housing either in the absence or presence of the operator in the housing, engine stoppage, closing the louvers, moving the gates to closed position and turning on the fire extinguishers are automatically effected substantially simultaneously.

In the embodiments of the invention before described, the tank 25 may contain baffle elements (not shown) therein and each plant may include an exterior manual release (not shown) for effecting louver and gate closing and turning on the fire-extinguishers which may have outlet nozzles in communication therewith and disposed close to the sides 20 and 21 and at different locations therealong. The embodiments of the invention before described are complete electric power generating plants which after the tank 25 is filled with the required liquid fuel are capable of operating for a considerable length of time and until the fuel in the tank 25 has been consumed. Obviously by merely adding fuel to tank 25 through fitting 39 before all of the fuel has been consumed, the plants may be kept in operation for very long periods of time. Each plant is self contained, with all of the operating elements carried by and disposed in the box. And in addition, the walk-path consisting of 80, 81 with the part of the unobstructed part of the platform consisting of the walls 32 and 33 is of such width, at least about 1½ feet throughout the entire length thereof that an operator may walk safely therealong from one end to the other. Preferably the unobstructed part of the platform is at least about 3' wide and the width of the walkways 80 and 81 is at least 1½ feet.

Since certain changes may be made in the afore-described constructions and different embodiments of the invention could be made without departing from the scope thereof, it is intended that all matter contained in the above description or shown in the accompanying drawing shall be interpreted as illustrative and not in a limiting sense.

We claim:
1. An electric power generating plant comprising:
   a housing including a pair of elongated sides, a bottom coupled with said sides at the lower ends thereof, a top coupled with said sides at the upper ends thereof, and front and rear ends coupled with said elongated sides, bottom and top;
   a pair of electric power generating units, each unit including a fluid fuel operated engine and an electric generator driven by an individual one of said engines and located at one end of said housing;
   a pair of fans in said housing;
   means for containing a supply of said fuel and communicating with said engines, said means being disposed in and supported by said housing;
   floor means supported by said housing, spaced above said bottom and below said top and extending from each end of said housing toward the other end thereof, said floor means having air passageways in communication with the space between said floor means and said bottom and the space in said housing between said floor means and said top;
   said units being enclosed in and supported by said housing, said units being spaced above said bottom and extending horizontally in opposite directions lengthwise along said housing, said generators being horizontally spaced from each other and being disposed between the engines and above said passageways;
   air inlet means located on each of said front and rear ends of said housing and communicating with said space between said floor means and said bottom for inspirating air for passage through said passageways; and
   outlet means located on each of said front and rear ends of said housing and communicating with the space in said housing surrounding said units for discharging air from said housing;
   each of said fans being effective for inspirating atmospheric air through said inlet means and the space between said bottom and said floor means, through said passageways into space in said housing between said floor means and said top, and then through the space in said housing surrounding said units and then discharges said air from said housing through said outlet means.

2. An electric power generating plant according to claim 1, wherein:
   one of said units is adjacent one of said sides and spaced a prescribed distance from the other of said sides, the other of said units is adjacent said other of said sides and spaced said prescribed distance from said one of said sides; and
   said housing further includes closures at each of said front and rear ends, each said closure having an enlarged opening therein for the passage of an adult therethrough, means for controlling the effective size of said outlet means, and a door for said enlarged opening, the opening in one of said closures being adjacent one of said sides and the opening of the other of said closures being adjacent the other of said sides.

3. An electric power generating plant according to claim 2, wherein:
   each of said units further includes a cooling radiator means individually associated with each of said engines in said housing;
   hollow means between each of said fans and said closures for maintaining the passage of said air in confined paths in the course of its travel thereof from said fans toward said outlet means;

a muffler means individually associated with each of said engines and disposed closer to the corresponding side than is the longitudinal center of said engine;

each of said closures having an exhaust opening and means associated with said exhaust opening and said muffler for a passage of exhaust gases therethrough;

and further including a plurality of elongated members spaced from each other and mounted on said bottom, said members extending from said front and rear ends of said housing and towards said containing means, said floor means mounted on said members to maintain said floor means spaced from said bottom.

4. An electric power generating plant according to claim 3 wherein:

said containing means is located in approximately the mid-section of said housing, is hollow, of approximately U-shape and mounted on said bottom, and having hollow legs respectively adjacent said sides and further having a hollow web extending between said sides and disposed between corresponding ends of said elongated members;

said web including a top wall, the distance between the extremities of said top wall taken along a center line of said housing extending from one end to the other end thereof being at a predetermined distance from said sides.

5. An electric power generating plant according to claim 1, further comprising:

means for controlling the passage of gases through said passageways, said passage controlling means including a gate movable from one position to another, when in one of said positions permitting said inspiration of atmospheric air through said passageways into said housing and when in another position substantially preventing the passage of gases from said housing into the atmosphere, said gate disposed between said bottom and said floor means.

6. An electric power generating plant according to claim 1, wherein:

said containing means is of substantially U-shape and having a web extending substantially horizontally between said sides and legs thereof extending vertically and adjacent to said sides;

further comprising instrument and main control panel means disposed between said legs;

one of said units disposed adjacent one of said sides and spaced sufficiently from the other of said sides so that the width of said floor means therebetween provides a walkway permitting an operator to walk therealong, the other unit disposed adjacent the other of said sides and spaced substantially from said one of said sides so that the width of said floor means therebetween provides a walkway permitting an operator to walk therealong;

said instrument and main electrical control panel means being adjacent one of said legs and spaced sufficiently from the other of said legs so that the distance therebetween is adequate for accommodating a walkway permitting an operator to walk therealong, said walkways thereby permitting an operator to walk the entire length of said housing between said front and rear ends;

and said housing further including an end closure at said front end, and another closure at said rear end, each of said closures including an individual said air outlet means in a vertical mid-section thereof for the passage of air therethrough from a corresponding end zone, means for controlling the effective size of said outlet means, an enlarged opening in the other vertical midsection thereof for the passage of an operator therethrough onto one of said first mentioned walkways, and a door for said enlarged opening.

7. An electric power generating plant according to claim 6 further comprising:

electrical power outlet receptacles carried by said end closures and means in said housing for electrically connecting said instrument and main electrical control panel means with said receptacles; and said electrical connecting means including an electrical distribution panel located in each of the end zones and disposed adjacent a side thereof.

8. An electric power generating plant comprising:

a housing including a pair of spaced sides, a pair of electric power generating units, each of said units supported by said housing and spaced above lower extremities of said sides and including an engine and an electric generator driven by said engine;

one of said engines located in an end zone of said housing and the other of said engines located in another end zone of said housing;

floor means supported in said housing and spaced above said lower extremities of said sides;

each one of said end zones including passageways for a passage of air therethrough into said one end zone from space between said floor means and said lower extremities of said sides;

a first outlet means for a first one of said end zones located on a side of said housing and second outlet means for a second one of said end zones located on an opposite end side of said housing from said housing side of said first outlet means;

and means operative for moving atmospheric air through the space between said floor means and said lower side extremities through said passageways and said end zones for exhaust through said first outlet means for said first one of said end zones and said second outlet means for said second one of said end zones.

9. An electric power generating plant according to claim 8 further comprising:

means dividing the space below said floor means and said lower side extremities into a first space portion for said first one of said end zones and a second space portion for said second one of said end zones;

a first air intake means for said first one of said end zones and located on said housing side of said first outlet means to admit atmospheric air for movement through said first space portion, said passageways of said first one of said end zones and through the last-mentioned end zone for exhaust through said first outlet means; and a second air intake means for said second one of said end zones and located on said housing side with said second outlet means to admit atmospheric air for movement through said second space portion, said passageways of said second one of said end zones and through the last-mentioned end zone for exhaust through said second outlet means.

10. An electric power generating plant according to claim 9 wherein:

each one of said end zones further includes a cooling radiator associated with said engine thereof and disposed in the air movement through said last-mentioned end zone;

said moving means comprises a plurality of fans, each of said fans being located in an individual one of said end zones for movement of said air therethrough and for cooperating with said radiator in the same end zone to effect a cooling operation under control of said air movements;

said passageways of said first and second ones of said end zones being located toward a central portion of said housing proximate to inner portions of said floor means;

each one of said end zones further including an individual conduit means for maintaining said air movement through said last-mentioned end zone in a prescribed path toward said respective one of said first and second outlet means; and means including gate and louver arrangements for controlling the effective opening of said passageways for each said end zone and said first and second outlet means to adjust air movement through and from each said end zone.

References Cited

UNITED STATES PATENTS

| | | | |
|---|---|---|---|
| 1,380,123 | 5/1921 | Sullivan | 290—1 |
| 1,947,713 | 2/1934 | Gumpper | 290—1.1 |
| 2,386,597 | 10/1945 | Couse | 290—1 |
| 2,630,537 | 3/1953 | Wiegman et al. | 290—1.1 |
| 3,418,485 | 12/1968 | Anderson et al. | 290—1 |

G. R. SIMMONS, Primary Examiner

U.S. Cl. X.R.

60—39.66; 290—2